W. I. THOMSON.
DYNAMO DRIVING.
APPLICATION FILED SEPT. 1, 1909.
957,522.
Patented May 10, 1910.
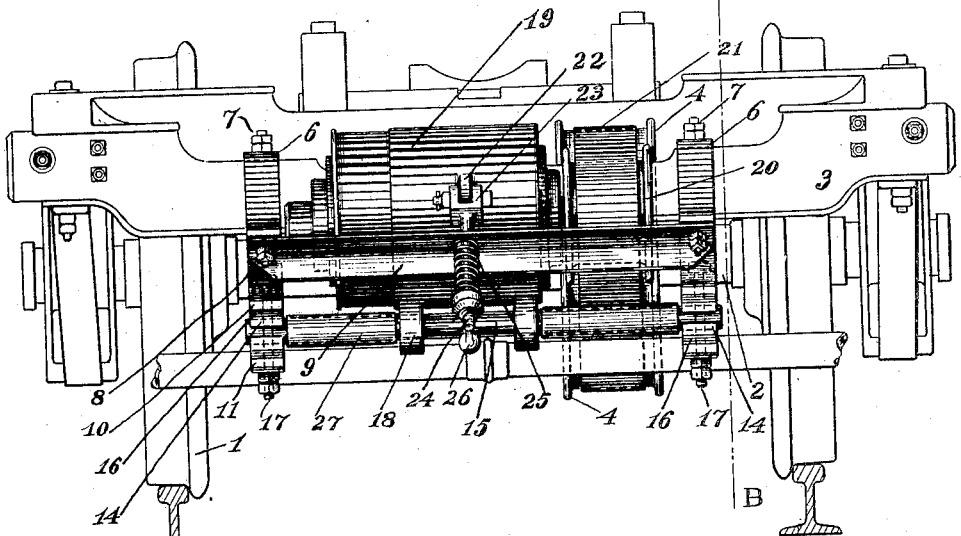
Fig. I.
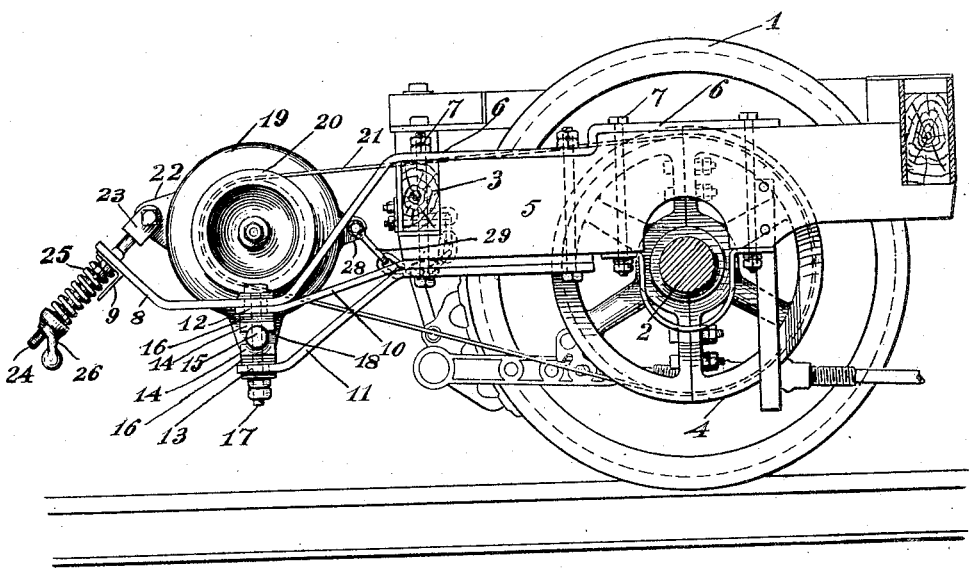
Fig. II.
Witnesses
E. Hall
M. Herskovitz
Inventor
William I. Thomson
By his Attorney
John L. Crosby

UNITED STATES PATENT OFFICE.

WILLIAM I. THOMSON, OF NEWARK, NEW JERSEY, ASSIGNOR TO THE SAFETY CAR HEATING & LIGHTING COMPANY, A CORPORATION OF NEW JERSEY.

DYNAMO-DRIVING.

957,522.

Specification of Letters Patent. Patented May 10, 1910.

Application filed September 1, 1909. Serial No. 515,617.

*To all whom it may concern:*

Be it known that I, WILLIAM I. THOMSON, a citizen of the United States, residing in Newark, county of Essex, and State of New Jersey, have invented new and useful Improvements in Dynamo-Driving, of which the following is a description.

My invention has for its object to provide means of driving a dynamo or generator by power derived from the motion of a car axle and has for its principal object to provide means whereby a dynamo may be carried in operative position with respect to one of the axles of a car and so connected thereto as to be driven thereby.

In the drawing Figure I represents an end view of a car truck carrying a dynamo, dynamo suspending mechanism and driving means comprehending my invention. Fig. II shows a longitudinal section of a truck through the line A—B of Fig. I and a side elevation of the dynamo suspension rigging.

In the drawing, referring to both Figs. I and II, 1 represents a car wheel provided with the usual axle 2 forming part of the usual car truck provided with the end-sill 3 and the usual safety sills 5.

4 represents a flanged driving pulley securely clamped upon the car axle so as to revolve therewith. Upon the upper side of the safety sills 5 there are bolted the two members 6 as by means of bolts 7, said members 6 being provided with up-turned extension ends 8 which are bolted to the transverse angle-iron 9. The bolts 7 also carry the members 10 and 11 which are firmly held thereby against the lower side of the safety sills 5. The members 10 are so shaped as to bear against the under sides of the members 6 and both members 6 and 10 have registering slots cut therein as indicated in dotted lines by the numeral 12. The members 11 are so shaped as to hang below the members 10 in such manner as to form a suitable space between said members and are provided at their extremities with slots indicated in dotted lines at 13. The members or blocks having cylindrical indentations therein as indicated at 14 serve to hold the transverse cylindrical bar 15 in place in its proper vertical alinement by means of liners 16 placed between the members 14 and the members 10 and 11. Bolts 17 passing through the slots 12, liners 16, members 14, rod 15, members 14, liners 16 and slot 13 serve to clamp the said members firmly in place and allow some adjustment by moving the bolts 17 in the slots 12 and 13. The bar 15 passes through the lugs 18 of the generator 19 in such manner as to support the generator and allow the same to have a rocking motion upon the rod 15 while the lateral position of the generator with respect to the rod 15 may be determined by the spacing members 27 which may be pieces of pipe slipped upon the rod. The generator 19 is provided with the driving pulley 20 engaging the belt 21 which also engages the pulley 4 upon the axle. The dynamo is also provided with a lug 22 engaging the clevis 23 carrying the rod 24 which passes through an opening in the angle-iron 9 and carries over the same the compression spring 25, against which is drawn the hand nut 26 threaded upon the rod 24. The other side of the generator is provided with a lug 28 to which is attached the chain 29 which is made fast to the end-sill in such manner as to prevent the generator from swinging too far in a direction away from the axle.

If the members 6, 10 and 11 be properly fastened in place upon the truck as by the bolts 7 and the generator be placed upon the rod 15 and proper spacing members 27 placed upon the rod and its ends placed in members 14, the generator by proper selection of liners 16 may be given the proper vertical position for operation, then by movement of the bolts 17 in the slots 12 and 13 the generator may be given the proper horizontal position for operation, then if the nuts be brought up upon the bolts 17 the generator will be held in proper operative relation to the axle 2, then if the pulley 4 be properly alined with reference to the generator and secured to the axle 2 the belt 21 may be readily passed around the driving pulley 4 and the dynamo pulley 20. This may be cut and spliced to the proper length and may be brought to the proper tension by screwing up of the hand nut 26 which will tend to compress the spring 25 so as to cause the rod 24 to tend to draw the generator 19 and pulley 20 away from the car axle 2.

It will be obvious that my invention provides a simple, strong and durable, as well as adjustable, frame or support for carrying the generator in such position that the driving belt may be passed over the end-sill of the truck and that the driving belt will be held taut and at proper tension regardless of ordinary play of the truck frame upon its springs and throughout the ordinary lateral movement of the car axle within its journals.

I do not wish in any way to limit myself to the exact form or details of construction shown in the attached drawing used to illustrate one form of dynamo driving comprehending my invention as it is obvious that considerable departure may be made therein and still within the scope of my invention which is as set forth in the following claims to wit:

1. The combination with a car truck having an axle, an end-sill and safety sills, of a dynamo and means for carrying the dynamo upon said truck in operative relation to said axle comprehending members attached to the upper side of the safety sills, members attached to the lower side of the said safety sills, a transverse member supported between the members carried by the safety sills on each side of the truck and means for mounting the dynamo upon said transverse member below the armature.

2. The combination with a car truck having an axle, an end-sill and longitudinal sills, of a pulley mounted to revolve with said axle, a dynamo, a transverse member placed below the center thereof and supporting said dynamo and members supported both by the end-sill and the longitudinal sills of said truck carrying said transverse member, a driving pulley for said dynamo, a belt engaging the said dynamo driving pulley and the pulley upon the axle and means tending to revolve said generator upon said transverse member to preserve substantially constant tension upon said belt.

3. The combination with a car truck comprising longitudinal sills, a transverse sill and an axle, of a pulley mounted upon said axle, a dynamo support attached to a plurality of the longitudinal sills and to one of the end-sills and provided with a transverse member, a dynamo mounted upon said transverse member in a position above the same, a driving pulley carried by the said dynamo, a driving belt inclosing the pulley upon the axle, the end-sill and the dynamo pulley and means for preserving substantially uniform tension upon said belt.

4. The combination with a car truck having an axle, a pulley upon said axle, a transverse sill and longitudinal sills, of longitudinal supporting members carried by a plurality of the longitudinal sills and the end-sill, a transverse member carried thereby, a dynamo carried upon said member and resting thereon at a point below its center, a pulley upon said dynamo, a second transverse member carried by the said longitudinal members, a belt engaging the pulley upon the axle and the dynamo pulley and means carried by the said last named transverse member for causing substantially uniform tension upon said belt.

5. The combination with a car truck having an axle, a pulley upon said axle, a plurality of longitudinal sills and an end-sill, of members carried by a longitudinal sill on each side of the truck and an end-sill, a transverse member adjustably secured between said longitudinal members, a dynamo supported upon said transverse member at a point below its center and capable of rotary motion upon said member, a driving pulley carried by the said dynamo, a belt inclosing the end-sill and engaging the pulley upon the axle and the dynamo pulley in such manner that rocking the generator upon its transverse supporting member varies the tension upon said belt and yielding means tending to revolve the generator upon said transverse member in a direction away from the car axle.

6. The combination with a car truck having an axle and longitudinal sills, of means for carrying a dynamo upon said truck comprehending a member upon each side of the truck carried upon the top of a longitudinal sill, a member carried against the lower side of a longitudinal sill, a member for a portion of its length held against said last named member below the longitudinal sill, an opening between the extremity thereof and the two above named members, a transverse member passing through said opening and means whereby said transverse member may be positively clamped in position in said opening between the members.

WILLIAM I. THOMSON.

Witnesses:
W. S. EVANS,
HERBERT J. SMITH.